(12) United States Patent
Evans et al.

(10) Patent No.: US 6,644,429 B2
(45) Date of Patent: Nov. 11, 2003

(54) HYDROSTATIC AUXILIARY DRIVE SYSTEM

(75) Inventors: Gladys L. Evans, Dubuque, IA (US); Judson P. Clark, Dubuque, IA (US); Glenn Owen Scheer, Durango, IA (US); William Michael Walter, Galena, IL (US); William Daniel Robinson, Epworth, IA (US); David William Stubben, Dubuque, IA (US); Alfred Sigmund Smemo, Dubuque, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/058,165

(22) Filed: Jan. 28, 2002

(65) Prior Publication Data

US 2002/0100630 A1 Aug. 1, 2002

(51) Int. Cl.[7] .............................................. B60K 17/356
(52) U.S. Cl. ........................ 180/307; 180/243; 180/246
(58) Field of Search ................................ 180/307, 197, 180/233, 242, 243, 305, 306, 244, 245, 246, 247, 248

(56) References Cited

U.S. PATENT DOCUMENTS

| 4,177,870 | A | | 12/1979 | Henn ........................ 180/243 |
|---|---|---|---|---|
| 4,183,419 | A | | 1/1980 | Henn et al. ................. 180/243 |
| 4,186,816 | A | | 2/1980 | Pfundstein .................. 180/243 |
| 4,546,844 | A | | 10/1985 | Stauffer ....................... 180/243 |
| 4,635,743 | A | * | 1/1987 | Riehl .......................... 180/243 |
| 4,986,377 | A | | 1/1991 | Moriarty ..................... 180/6.5 |
| 5,147,010 | A | * | 9/1992 | Olson et al. ................. 180/197 |
| 5,172,787 | A | * | 12/1992 | Kobayashi .................. 180/197 |
| 5,303,794 | A | * | 4/1994 | Hrovat et al. ............... 180/197 |
| 5,682,950 | A | | 11/1997 | Bjornstad ..................... 166/99 |
| 5,819,870 | A | * | 10/1998 | Braun ......................... 180/197 |
| 5,848,664 | A | * | 12/1998 | Kaspar ........................ 180/197 |
| 6,109,384 | A | * | 8/2000 | Bromley et al. ............ 180/242 |
| 6,112,842 | A | | 9/2000 | Ura et al. .................... 180/233 |

* cited by examiner

Primary Examiner—Brian L. Anderson
Assistant Examiner—Bridget Avery

(57) ABSTRACT

A dual path hydrostatic drive system having an electronic auxiliary drive auxiliary drive controller controlling the hydraulic output of left and right variable displacement pumps in response to the speed of the main drive wheels and a speed ratio signal from a speed ratio input control. In addition, the auxiliary drive auxiliary drive controller controls the outputs of the pumps within three basic boundary conditions; a hydraulic pressure boundary condition, a motor speed boundary condition and a power boundary condition. A clutch mode activation switch has two positions for signaling the auxiliary drive auxiliary drive controller to operate in a first mode in which the auxiliary drive system is shut down upon activation of the main clutch or a second mode where the auxiliary drive controller attempts to mirror the operation of the main drive wheels.

20 Claims, 3 Drawing Sheets

HYDROSTATIC AUXILIARY DRIVE SYSTEM

FIELD OF THE INVENTION

The present invention is directed to a dual path hydrostatic auxiliary drive system having hydraulic pressure, motor speed and power boundaries to limit system output.

BACKGROUND OF THE INVENTION

Motor graders are large work vehicles. Typically they are provided with a main frame that is pivotally coupled to a forwardly extending frame about a vertical pivot axis. The main frame is provided with four driven wheels. Two longitudinally separated wheels are located on each side of the main frame. The main frame houses the internal combustion engine for powering the grader. The forwardly extending frame is supported on two front wheels. The forwardly extending frame is provided with a drawbar having a grader circle. A grader blade is mounted to the grader circle by a blade frame. The position of the grader blade relative to the grader frame is controlled by hydraulic cylinders. A saddle is mounted to the forwardly extending frame above the grader circle. The saddle is provided with hydraulic cylinders for manipulating the position of the grade circle relative to the forwardly extending frame.

Some graders are all wheel drive machines. Hydraulic wheel motors drive the front wheels. The motors selectively engage the front wheels by hydraulic clutches. The front wheels may be driven in an overdrive mode, where they are driven at a faster speed than the rear wheels; at an equal speed mode where they are driven at the same speed as the rear wheels; or in an underdrive mode, where they are driven slower than the rear wheels.

One manufacturer of all wheel drive motor graders uses mechanical overrunning clutches in place of hydraulically applied clutches. Another manufacturer markets an all wheel drive motor grader having a dual path hydrostatic auxiliary drive system.

SUMMARY

It is an object of the present invention to provide an improved dual path hydrostatic auxiliary drive system having an auxiliary controller that controls the speed of the auxiliary drive wheels as a function of the speed of the main drive wheels in conjunction with various boundary conditions.

A vehicle having a frame that is propelled by main drive wheels that are driven by an engine and main transmission is provided with an auxiliary drive system for left and right auxiliary drive wheels. The left and right auxiliary drive wheels are driven by two independent hydraulic circuits that are independently controlled by an electronic auxiliary drive controller. Each of the hydraulic circuits has a variable displacement pump, a hydraulic motor and a hydraulically actuated clutch located between the motor and the respective auxiliary drive wheel. A directional control valve is located in the hydraulic circuit between the variable displacement pump and the hydraulic motor.

The auxiliary drive controller is in communications with a number of sensors. A main speed sensor provides a main speed signal indicating the speed of the main drive wheels. Auxiliary wheel speed sensors provide auxiliary wheel speed signals indicating the speed of the auxiliary drive wheels. Clutch pressure sensors provide clutch pressure signals indicating the hydraulic pressure being applied to the clutches. An engine speed sensor provides an engine speed signal indicating the speed of the engine.

The auxiliary drive controller independently controls the displacement and thereby the hydraulic output of the variable displacement pumps. The auxiliary drive controller drives the auxiliary drive wheels at a speed that is a fixed ratio to the speed of the main drive wheels. It does this by monitoring the main speed signal and comparing it to the auxiliary wheel speed signals.

A number of boundary conditions are stored in the auxiliary controller. There are three basic control boundaries stored in the auxiliary controller: a hydraulic pressure boundary, a motor speed boundary and a power limit boundary. If any of these boundaries are exceed by the auxiliary wheel speed signal, clutch pressure signal or a combination of these two signals, the auxiliary drive controller reduces the output of the respective variable displacement hydraulic pump. An engine speed boundary is also stored in the auxiliary controller. If the engine speed signal falls below this boundary the auxiliary drive system is shut down by reducing the flow of both variable displacement pumps to the lowest level possible.

A main clutch is drivingly positioned between the main transmission and the engine for modulating the speed of the main transmission. A clutch activation switch signals the main transmission controller and the auxiliary drive controller when the clutch is engaged and disengaged. The auxiliary controller is provided with a clutch mode selector switch having first and second modes of operation. In its first, OFF, position the auxiliary drive system shuts down by reducing the output of the variable displacement pumps to the lowest level possible whenever the main clutch is engaged. In its second, ON, position the auxiliary drive controller attempts to mirror the operation of the main clutch in controlling the output of the variable displacement pumps. The auxiliary drive controller uses the engine speed signal and the main speed signal to calculate the slip between the engine and main transmission when mirroring the operation of the main clutch.

DETAILED DESCRIPTION

Figure 1:
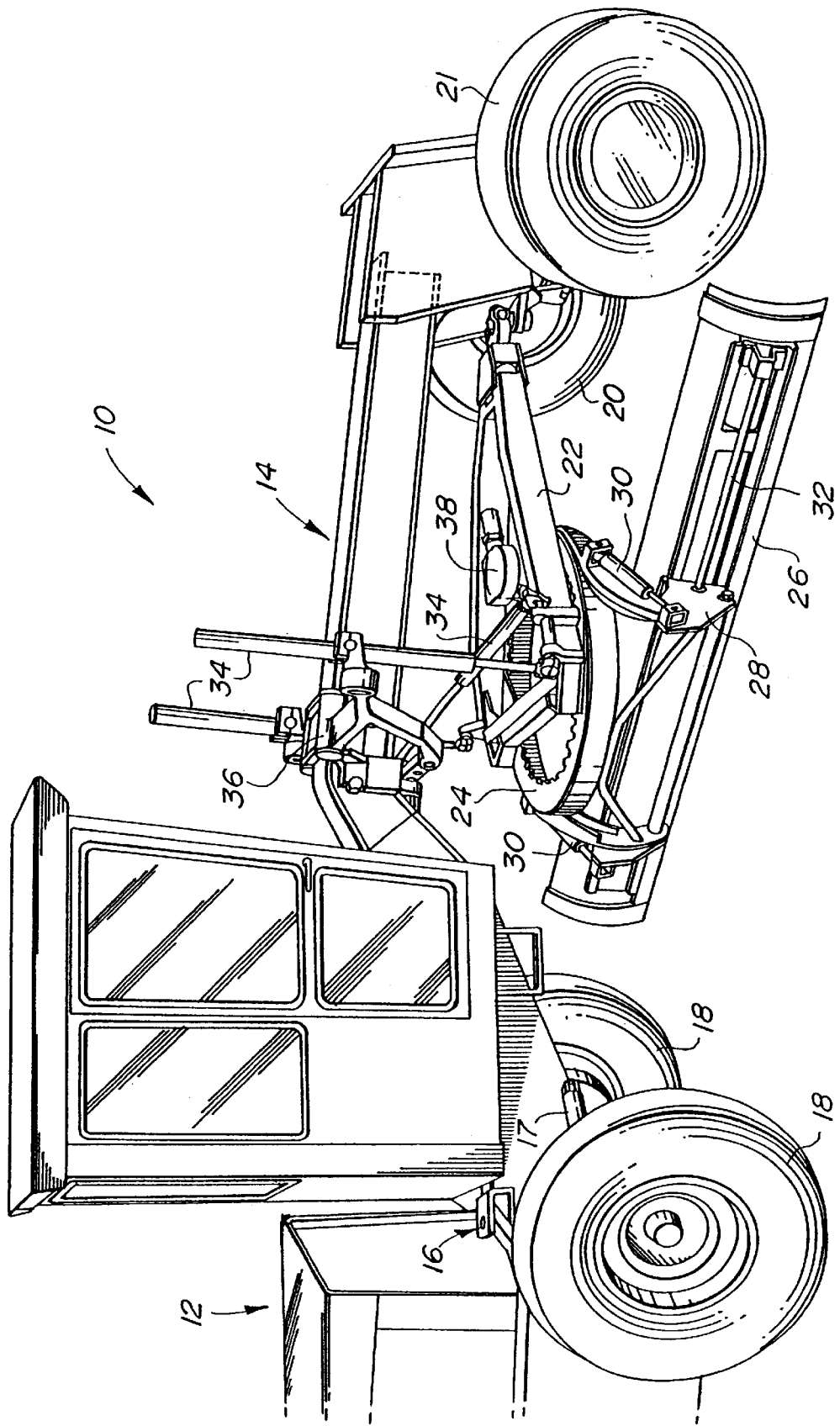
FIG. 1 is a perspective view of a motor grader.
Figure 2:
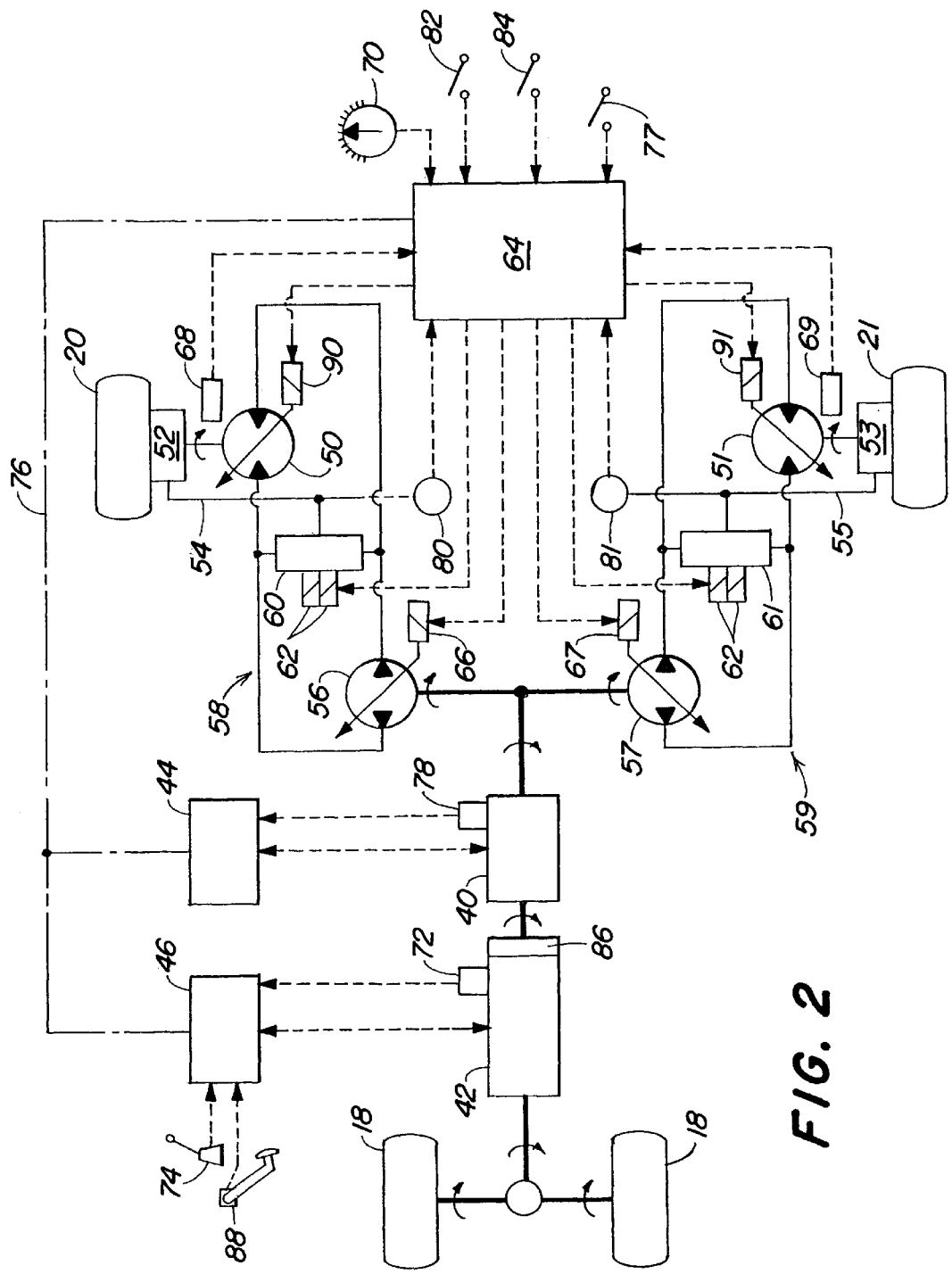
FIG. 2 is an electrical/hydraulic schematic of the subject auxiliary drive system.

Motor grader 10 is illustrated in FIG. 1. Grader 10 comprises a main frame 12 and a forwardly extending frame 14. A vertical pivot 16 pivotally couples the frames 12 and 14 to one another. Hydraulic cylinders 17, only one shown, articulate the position of the front frame 14 relative to the rear frame 12. The rear frame 12 is provided with four main drive wheels 18 arranged in a right pair and a left pair, only the front drive wheels of each pair are shown. The front frame 14 is provided with left and right auxiliary drive wheels 20 and 21, respectively. The main drive wheels 18 are driven by an engine 40 through a main transmission 42. The engine 40 is provided with an electronic engine controller 44 and the main transmission 42 is provided with an electronic main transmission controller 46.

The front frame is also provided with a rearwardly extending drawbar 22 having a grader circle 24. A grader blade 26 is mounted to the grade circle 24 by blade frame 28. Hydraulic cylinders 30 control the pivotal position of the grader blade 26 relative to the grader frame 28. The lateral position of the grader blade 26 relative to the grader frame 28 is controlled by hydraulic cylinder 32, only the rod end being shown. Hydraulic cylinders 34 that are mounted to saddle 36 control the position of the drawbar 22 relative to the front frame 14. The grader circle is rotatively positioned relative to the drawbar 22 by a grader circle motor 38.

The left and right auxiliary drive wheels 20 and 21 are driven by left and right hydraulic motors 50 and 51. Left and right hydraulically actuated clutches 52 and 53 are positioned between the left and right auxiliary drive wheels 20 and 21 and the left and right hydraulic motors 50 and 51. The left and right hydraulic motors 50 and 51 are variable displacement motors each having two displacement configurations. The left clutch 52 is supplied pressurized hydraulic fluid through left clutch hydraulic line 54, and right clutch 53 is supplied pressurized hydraulic fluid through right clutch hydraulic line 55. A left variable displacement hydraulic pump 56 directs pressurized fluid to the left hydraulic motor 50 through a closed left hydraulic circuit 58. Similarly, a right variable displacement hydraulic pump 57 directs pressurized hydraulic fluid to the right hydraulic motor 51 through a closed right hydraulic circuit 59. A left directional control valve 60 is hydraulically positioned between the left hydraulic motor 50 and the left variable displacement hydraulic pump 56. A right directional control valve 61 is hydraulically positioned between the right hydraulic motor 51 and the right variable displacement hydraulic pump 57. Both directional control valves 60 and 61 are three-position valves actuated by dual solenoids 62. The central position of the three-position valve defines a neutral or free wheeling position wherein the left and right auxiliary drive wheels 20 and 21 can freewheel.

The displacement configurations of the left and right variable displacement pumps 56 and 57 are independently controlled by an electronic auxiliary drive controller 64 through left and right solenoids 66 and 67 that position the swash plates on the pumps. The positions of the left and right directional control valves 60 and 61 are controlled by auxiliary drive controller 64 by selectively energizing the solenoids 62. The auxiliary drive controller 64 also controls the displacement configuration of the left and right variable displacement hydraulic motors 50 and 52 through left and right solenoids 90 and 91.

Left and right auxiliary wheel speed sensors 68 and 69 generate left and right auxiliary wheel speed signals that are transmitted to the electronic auxiliary drive controller 64. The auxiliary drive controller 64 also receives a speed ratio signal from a speed ratio control 70 located in the operator's cab of the vehicle 10. The operator sets this control 70 to the desired aggressiveness of the auxiliary drive system. For example, the operator can select an equal speed mode where the auxiliary drive wheels 20 and 21 are driven at the same speed as the main drive wheels 18; an underdrive mode where the auxiliary drive wheels are driven 20 and 21 slightly slower that the main drive wheels 18; or an overdrive mode where the auxiliary drive wheels 20 and 21 are driven slightly faster than the main drive wheels 18. The underdrive and overdrive driving modes have various gradations within each mode so the operator can better tailor his operations. A main speed sensor 72 communicates the speed of the main transmission 42 to the main transmission controller 46 which in turn directs a main speed signal to the auxiliary drive controller 64 indicating the speed of the main drive wheels 18. The auxiliary drive controller 64 adjusts the displacement configurations of the left and right variable displacement hydraulic pumps 56 and 57 to adjust the speed of the auxiliary drive wheels 20 and 21 to the selected speed ratio of the main drive wheels 18 as indicated by speed ratio control 70. It should be noted that the main speed signal can be transmitted directly from a sensor on the final drives of the main drive wheels 18, or a sensor measuring the speed of the main drive wheels 18 themselves, or it can be derived from the main transmission controller 46. The left and right auxiliary wheel speed sensors 68 and 69 can sense the output speed of the respective hydraulic motor 50 and 51, or the speed of the final drives for the auxiliary drive wheels 20 and 21.

The main transmission controller 46 also signals the electronic auxiliary drive controller 64 with a gearing signal that indicates what gear or speed has been selected and in what direction the vehicle is moving as dictated by the operator through shift lever 74. For example, motor grader 10 may have a eight-speed transmission with eight forward gears and eight reverse gears. If the auxiliary drive system is turned on by switch 77, the main transmission controller 46 signals the electronic auxiliary drive controller 64 with the selected gearing and the direction of vehicle movement. Based on this information, the auxiliary drive controller 64 adjusts the swash plates on the left and right variable displacement hydraulic pumps 56 and 57 for the selected gearing and adjusts the left and right directional control valves 60 and 61 to correctly orient the flow of hydraulic fluid in the left and right hydraulic circuits 58 and 59. The auxiliary drive controller 64 also adjusts the displacement of the left and right hydraulic motors 50 and 51 based upon the selected gearing. For gears one through four a first displacement configuration for the left and right hydraulic motors 50 and 51 may be used, for gears five through seven a second displacement configuration may be used, and for gear eight the auxiliary drive system maybe shut down altogether. Various signals between the controllers 44, 46 and 64 are transmitted through a CAN bus 76.

Controlling speed of the auxiliary drive wheels 20 and 21 as a function of the speed of the main drive wheels 18 is the basic function of the auxiliary drive controller 64. However a number of operational boundary conditions have been programmed into the auxiliary drive controller 64 to make it more effective. An engine speed sensor 78 transmits an engine speed signal to the controller the engine controller 44. A minimum engine speed boundary is stored in the auxiliary drive controller 64. The minimum engine speed boundary is a level at which the engine 40 is lugging down and the operator needs to turn off parasitic systems, such as the auxiliary drive system. When the auxiliary drive controller 64 detects an engine speed signal that is less than the minimum engine speed boundary, the auxiliary drive controller 64 reduces the flow of pressurized hydraulic fluid out of the left and right variable displacement pumps 56 and 57 to the lowest level possible. As such, the left and right clutches 52 and 53 are disengaged because of the reduction of pressure in hydraulic lines 54 and 55.

Figure 3:
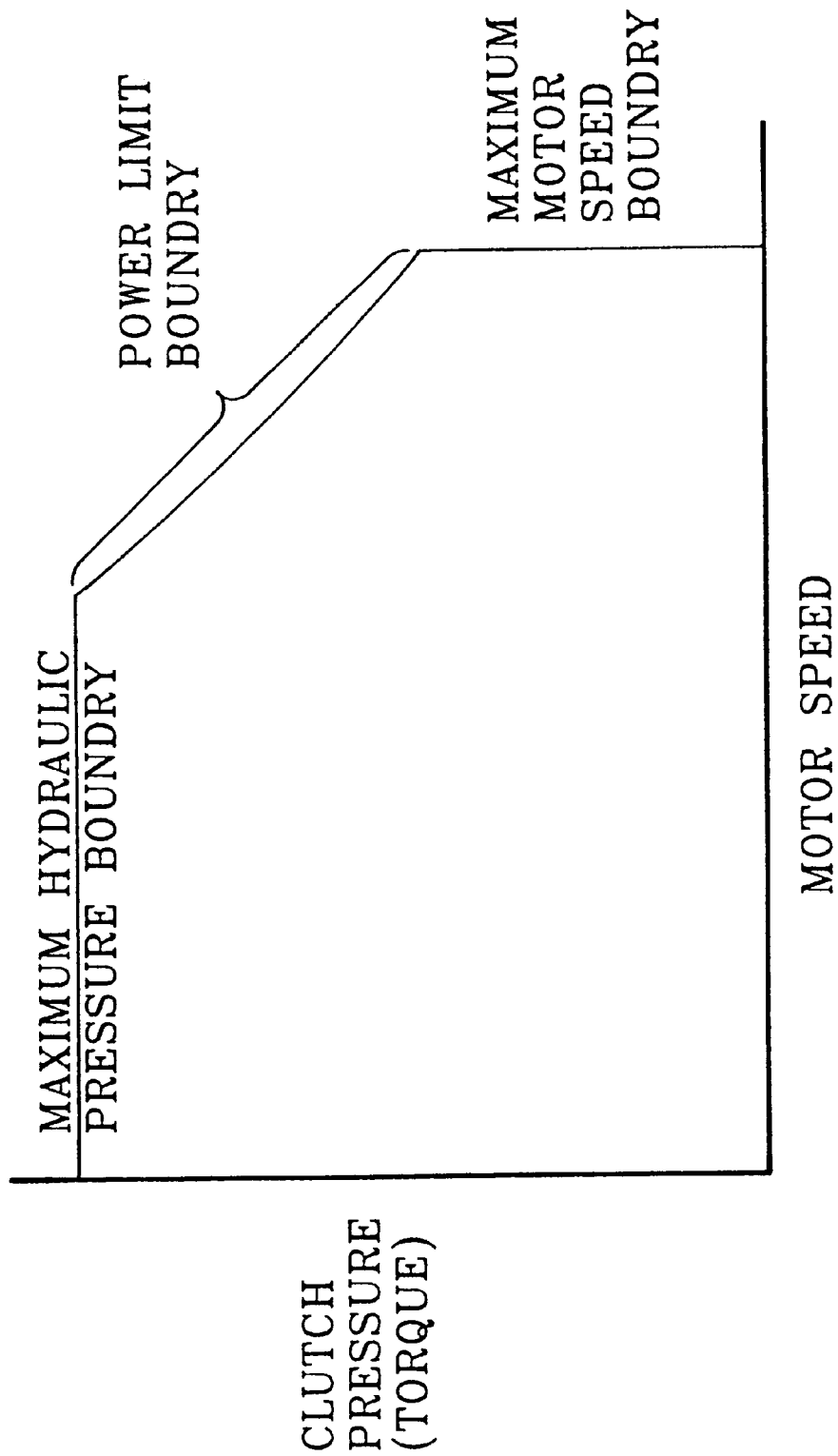
FIG. 3 is a graph of the operating boundaries.

As shown in FIG. 3, three basic boundary conditions influence the normal operation of the auxiliary drive system. The first boundary is a maximum pressure boundary. A maximum hydraulic pressure boundary is stored in the auxiliary drive controller 64. Left and right clutch pressure sensors 80 and 81 generate left and right clutch pressure signals that are transmitted to the auxiliary drive controller 64. The clutch pressure sensors 80 and 81 are hydraulically coupled to their respective clutch hydraulic lines 54 and 55. The auxiliary drive controller 64 compares the stored maximum pressure boundary against the left and right hydraulic clutch pressure signals. If one of the clutch pressure signals exceeds the maximum pressure boundary, the output of the respective variable displacement pump is reduced. The hydraulic clutch pressure signals are directly related to the torque being transmitted by the clutches to the wheels and by the wheels to the ground.

The second boundary is the maximum motor speed boundary. A maximum motor speed boundary is stored in the auxiliary drive controller 64. The stored maximum motor speed boundary is compared against the left and right auxiliary wheel speed signals from wheel speed sensors 68 and 69. If one of the auxiliary wheel speed signals exceeds the maximum motor speed boundary, the output of the respective variable displacement pump is reduced.

If the engine 40 had infinite power or a rather large power reserve the maximum pressure boundary and the maximum motor speed boundary would be adequate. However, good engineering dictates sizing the engine for the appropriate work. As such, a power limit boundary is stored in the auxiliary drive controller 64. The power limit boundary is proportional to the maximum power output of the engine 40. For example it can be one-third of the maximum power output of the engine. In this way one-third of engine torque would be consumed by auxiliary drive system and two-thirds would be consumed by the main transmission 42. The proportion of the engine power used by the auxiliary drive system can be controlled by adjusting the power limit boundary stored in the auxiliary drive controller 64. If one of the clutch pressure signals when combined with the respective auxiliary wheel speed signals exceeds the power limit boundary, the output of the respective variable displacement pump is reduced.

The auxiliary drive controller 64 drives the left and right auxiliary drive wheels 20 and 21 independently of one another. As such, it is possible that the speed of one of the auxiliary drive wheels would be controlled by the speed ratio control 70 and the other auxiliary drive wheel would be controlled by the pressure or power boundary conditions. This optimizes tractive effort and efficiency in conditions where one front wheel has good traction and the other does not.

The operator's cab of the motor grader 10 is provided with a clutch pedal 88 for actuating the main clutch 86. In motor graders this clutch pedal 88 is typically known as an inching pedal. By fully depressing the clutch pedal 88 the clutch 86 disengages the main transmission 42 from the engine 40. By lifting the clutch pedal 88 the main clutch 86 passes through a modulation zone where the main clutch 86 modulates the speed of the transmission. The operation of the main clutch 86 like the operation of the main transmission 42 is controlled by a main transmission controller 46. The main transmission controller 46 is alerted to the movement of the clutch pedal 88 by a clutch activation switch 84 that is actuated by the initial movement of the clutch pedal 88. Clutch activation switch 84 is also directly connected to the auxiliary drive controller 64. So the auxiliary drive controller 64 is alerted to a main clutching event directly by clutch activation switch 84 and also by the main transmission controller 46 through CAN bus 76.

Clutch mode selector switch 82 is connected to the auxiliary drive controller 64. The clutch mode selector switch 82 has two modes: a first OFF mode where the auxiliary drive system is turned off when the main clutch 86 is applied, and a second ON mode where the speed of the auxiliary drive wheels 20 and 21 is modulated in tandem with the main drive wheels 18. The clutch mode selector 82 is located in the operator's cab.

If the clutch mode selector switch is in its first OFF mode, when the clutch pedal 88 is depressed the auxiliary drive controller 64 is alerted and the controller 64 reduces the output of the left and right variable displacement hydraulic pumps 56 and 57 to the lowest level possible. As such, the left and right clutches 52 and 53 are disengaged because of the reduction of pressure in hydraulic lines 54 and 55. As the clutch pedal 88 is raised the clutch activation switch 84 signals the auxiliary drive controller 64 to reapply driving force to the auxiliary drive wheels 20 and 21.

If the clutch mode selector switch 82 is in its second ON position, when the clutch pedal 88 is depressed the auxiliary drive controller 64 is alerted and the controller 64 attempts to mirror the modulation of the main clutch 86. The auxiliary drive controller 64 receives a main speed signal indicating the speed of the main transmission 42 from transmission controller 46 and an engine speed signal indicating the speed of the engine from engine controller 44. From these signals the auxiliary controller 64 can calculate slip between the engine 40 and the main transmission 42 and adjust the output of the left and right variable displacement hydraulic pumps 56 and 57 accordingly.

Having described the preferred embodiment, it will become apparent that various modifications can be made without departing from the scope of the invention as defined in the accompanying claims.

What is claimed is:

1. A vehicle comprising;

a frame;

an engine mounted to the frame;

a main transmission drivingly coupled to the engine;

left and right main drive wheels are mounted to the frame and are drivingly coupled to the main transmission for propelling the vehicle;

left and right auxiliary drive wheels are mounted to the frame, the left auxiliary drive wheel is drivingly coupled to a left hydraulic motor by a left clutch, the right auxiliary drive wheel is drivingly coupled to a right hydraulic motor by a right clutch, the left hydraulic motor is hydraulically coupled to a left variable displacement hydraulic pump, the right hydraulic motor is hydraulically coupled to a right variable displacement hydraulic pump, the left and right variable displacement hydraulic pumps are drivingly coupled to the engine and have an output that drives the left and right hydraulic motors, the left and right clutches are operated by pressurized hydraulic fluid, the left clutch being hydraulically coupled to the left variable displacement hydraulic pump by a left clutch hydraulic line and the right clutch being hydraulically coupled to the right variable displacement hydraulic pump by a right clutch hydraulic line;

a main speed sensor providing a main speed signal indicating the speed of the main drive wheels;

a left auxiliary wheel speed sensor providing a left auxiliary wheel speed signal indicating the speed of the left auxiliary drive wheel;

a right auxiliary wheel speed sensor providing a right auxiliary wheel speed signal indicating the speed of the right auxiliary drive wheel;

a left clutch pressure sensor providing a left clutch pressure signal indicating the hydraulic pressure being applied to the left clutch through the left clutch hydraulic line;

a right clutch pressure sensor providing a right clutch pressure signal indicating the hydraulic pressure being applied to the right clutch through the right clutch hydraulic line;

an auxiliary drive controller controllably connected to the left and right variable displacement hydraulic pumps, the auxiliary drive controller being in communication with the main speed sensor for receiving the main speed signal, the auxiliary drive controller being in communication with the left and right auxiliary wheel speed sensors for receiving the left and right auxiliary wheel speed signals, the auxiliary drive controller being in communication with the left and right clutch pressure sensors for receiving the left and right clutch pressure signals, the auxiliary drive controller controlling the output of the left variable displacement hydraulic pump in response to the main speed signal, the left auxiliary wheel signal and the left clutch pressure signal, the auxiliary drive controller controlling the output of the right variable displacement hydraulic pump in response to the main speed signal, the right auxiliary wheel signal and the right clutch pressure signal.

2. A vehicle as defined by claim 1 wherein a hydraulic pressure boundary is stored in the auxiliary drive controller, the auxiliary drive controller reduces the output of the left variable displacement hydraulic pump when the left clutch hydraulic pressure signal exceeds the hydraulic pressure boundary and the auxiliary drive controller reduces the output of the right variable displacement hydraulic pump when right clutch hydraulic pressure signal exceeds the hydraulic pressure boundary.

3. A vehicle as defined by claim 1 further comprising a main clutch drivingly positioned between the engine and the main transmission for modulating the speed of the main transmission, a clutch activation switch is actuated when the main clutch is engaged and disengaged, a clutch mode selector switch having a first position defining a first mode of operation and a second position defining a second mode of operation is connected to the auxiliary controller, the auxiliary drive controller being in communication with the clutch activation switch and the clutch mode selector switch, when the clutch mode selector switch is in its first position the auxiliary drive controller reduces the output of the at least one hydraulic pump when the main clutch is engaged as indicated by the clutch activation switch, when the clutch mode selector switch is in its second position the auxiliary drive controller attempts to mirror the operation of the main clutch in controlling the output of the at least one hydraulic pump.

4. A vehicle as defined by claim 2 wherein a motor speed boundary is stored in the auxiliary drive controller, the auxiliary drive controller reduces the output of the left variable displacement hydraulic pump when the left auxiliary wheel speed signal exceeds the motor speed boundary and the auxiliary drive controller reduces the output of the right variable displacement hydraulic pump when the right auxiliary wheel speed signal exceeds the motor speed boundary.

5. A vehicle as defined by claim 3 further comprising an engine speed sensor providing an engine speed signal indicating the speed of the engine, the engine speed signal and the main speed signal being used by the auxiliary drive controller to calculate the slip between the engine and the main transmission when mirroring the operation of the main clutch.

6. A vehicle as defined by claim 4 wherein a power limit boundary is stored in the auxiliary drive controller, the power limit boundary is proportional to maximum engine output of the engine, the auxiliary drive controller reduces the output of the left variable displacement hydraulic pump when the left clutch hydraulic pressure signal combined with the left auxiliary wheel speed signal exceeds the power limit boundary and the auxiliary drive controller reduces the output of the right variable displacement hydraulic pump when the right clutch hydraulic pressure signal combined with the right auxiliary wheel speed signal exceeds the power limit boundary.

7. A vehicle as defined by claim 6 wherein a minimum engine speed boundary is stored in the auxiliary drive controller, the auxiliary drive controller receives an engine speed signal from an engine speed sensor indicating the speed of the engine, the auxiliary drive controller reduces the output of the left and right variable displacement hydraulic pumps if the engine speed signal falls below the minimum engine speed boundary.

8. A vehicle as defined by claim 7 further comprising a speed ratio input control that provides a speed ratio signal to the auxiliary drive controller indicating at what speed ratio the operator wants the left and right auxiliary drive wheels driven as a function of the speed of the main drive wheels.

9. A vehicle as defined by claim 8 wherein a left directional control valve is hydraulically positioned between the left hydraulic motor and the left variable displacement hydraulic pump and a right directional control valve is hydraulically positioned between the right hydraulic motor and the right variable displacement hydraulic pump.

10. A vehicle as defined by claim 9 wherein the right hydraulic motor and the left hydraulic motor are both variable displacement motors in which displacement configuration can be selected by the auxiliary drive controller.

11. A vehicle as defined by claim 10 wherein the main transmission has different gears corresponding to different speeds at which the work vehicle is driven, a gear signal indicating the gear at which the transmission is operating is transmitted to the auxiliary drive controller, the auxiliary drive controller selects the displacement of the left and right hydraulic motors based on the gear signal.

12. A vehicle as defined by claim 11 further comprising a main clutch drivingly positioned between the engine and the main transmission for modulating the speed of the main transmission, a clutch activation switch is actuated when the main clutch is engaged and disengaged, a clutch mode selector switch having a first position defining a first mode of operation and a second position defining a second mode of operation is connected to the auxiliary controller, the auxiliary drive controller being in communication with the clutch activation switch and the clutch mode selector switch, when the clutch mode selector switch is in its first position the auxiliary drive controller reduces the output of the at least one hydraulic pump when the main clutch is engaged as indicated by the clutch activation switch, when the clutch mode selector switch is in its second position the auxiliary drive controller attempts to mirror the operation of the main clutch in controlling the output of the at least one hydraulic pump.

13. A vehicle as defined by claim 12 wherein the engine speed signal and the main speed signal are used by the auxiliary drive controller to calculate the slip between the engine and the main transmission when mirroring the operation of the main clutch.

14. A vehicle comprising;
a frame;
an engine mounted to the frame;
a main clutch drivingly coupled to the engine;
a main transmission drivingly coupled to the main clutch, wherein the main clutch modulates the speed of the main transmission and the engine;

a clutch activation switch is actuated when the main clutch is engaged and disengaged;

a clutch mode selector switch having a first position defining a first mode of operation and a second position defining a second mode of operation;

left and right main drive wheels are mounted to the frame and are drivingly coupled to the transmission for propelling the work vehicle;

left and right auxiliary drive wheels are mounted to the frame, the left and right auxiliary drive wheels are drivingly coupled to at least one hydraulic motor which is driven by at least one hydraulic pump, the at least one hydraulic pump having an output;

an auxiliary drive controller for controlling the output of the at least one hydraulic pump for driving the left and right auxiliary wheels, the auxiliary drive controller being in communication with the clutch activation switch and the clutch mode selector switch, when the clutch mode selector switch is in its first position the auxiliary drive controller reduces the output of the at least one hydraulic pump when the main clutch is engaged as indicated by the clutch activation switch, when the clutch mode selector switch is in its second position the auxiliary drive controller attempts to mirror the operation of the main clutch in controlling the output of the at least one hydraulic pump.

15. A vehicle as defined by claim 14 further comprising a main speed sensor providing a main speed signal indicating the speed of the main transmission and an engine speed sensor providing an engine speed signal indicating the speed of the engine, the engine speed signal and the main speed signal being used by the auxiliary drive controller to calculate the slip between the engine and the main transmission when mirroring the operation of the main clutch.

16. A vehicle as defined by claim 15 wherein the at least one pump comprises a variable displacement pump.

17. An auxiliary drive system for a vehicle having an engine, a main transmission driven by the engine and main drive wheels driven by the main transmission; the auxiliary drive system comprising;

left and right auxiliary drive wheels each of which are driven by an independent hydraulic motor located in a separate hydraulic circuit, each of the independent hydraulic motors have separate hydraulically actuated clutches, the separate hydraulic circuits each having a variable displacement pump;

a main speed sensor providing a main speed signal indicating the speed of the main drive wheels;

auxiliary wheel speed sensors providing auxiliary wheel speed signals indicating the speeds of the left and right auxiliary drive wheels;

clutch pressure sensors providing clutch pressure signals indicating the hydraulic pressure being applied to the hydraulically actuated clutches;

an auxiliary drive controller controllably connected to the variable displacement hydraulic pumps, the auxiliary drive controller being in communication with the main speed sensor for receiving the main speed signal, the auxiliary drive controller being in communication with the auxiliary wheel speed sensors for receiving the auxiliary wheel speed signals, the auxiliary drive controller being in communication with the clutch pressure sensors for receiving the clutch pressure signals, the auxiliary drive controller independently controlling the output of the variable displacement hydraulic pumps in response to the main speed signal and the auxiliary wheel speed signals so that the auxiliary drive wheels are driven at a speed proportional to the main drive wheels, a hydraulic pressure boundary is stored in the auxiliary drive controller, the auxiliary drive controller independently reduces the output of the variable displacement hydraulic pumps when the clutch hydraulic pressure signals exceed the hydraulic pressure boundary.

18. An auxiliary drive system for a vehicle having an engine, a main transmission driven by the engine and main drive wheels driven by the main transmission; the auxiliary drive system comprising;

left and right auxiliary drive wheels each of which are driven by an independent hydraulic motor located in a separate hydraulic circuit, the separate hydraulic circuits each having a variable displacement pump generating a hydraulic pressure;

a main speed sensor providing a main speed signal indicating the speed of the main drive wheels;

auxiliary wheel speed sensors providing auxiliary wheel speed signals indicating the speeds of the left and right auxiliary drive wheels;

an auxiliary drive controller controllably connected to the variable displacement hydraulic pumps, the auxiliary drive controller being in communication with the main speed sensor for receiving the main speed signal, the auxiliary drive controller being in communication with the auxiliary wheel speed sensors for receiving the auxiliary wheel speed signals, the auxiliary drive controller independently controlling the output of the variable displacement hydraulic pumps in response to the main speed signal and the auxiliary wheel speed signals so that the auxiliary drive wheels are driven at a speed proportional to the main drive wheels, a motor speed boundary is stored in the auxiliary drive controller, the auxiliary drive controller independently reduces the output of the variable displacement hydraulic pumps when the auxiliary wheel speed signals exceed the motor speed boundary.

19. An auxiliary drive system for a vehicle having an engine, a main transmission driven by the engine and main drive wheels driven by the main transmission; the auxiliary drive system comprising;

left and right auxiliary drive wheels each of which are driven by an independent hydraulic motor located in a separate hydraulic circuit, the separate hydraulic circuits each having a variable displacement pump;

a main speed sensor providing a main speed signal indicating the speed of the main drive wheels;

auxiliary wheel speed sensors providing auxiliary wheel speed signals indicating the speeds of the left and right auxiliary drive wheels;

an auxiliary drive controller controllably connected to the variable displacement hydraulic pumps, the auxiliary drive controller being in communication with the main speed sensor for receiving the main speed signal, the auxiliary drive controller being in communication with the auxiliary wheel speed sensors for receiving the auxiliary wheel speed signals, the auxiliary drive controller independently controlling the output of the variable displacement hydraulic pumps in response to the main speed signal and the auxiliary wheel speed signals so that the auxiliary drive wheels are driven at a speed proportional to the main drive wheels, wherein a power limit boundary is stored in the auxiliary drive controller, the power limit boundary is proportion to maximum engine output of the engine, the auxiliary drive controller independently reduces the output of the variable displacement hydraulic pumps when the clutch hydraulic pressure signals combined with the auxiliary wheel speed signals exceed the power limit boundary.

20. An auxiliary drive system for a vehicle having an engine, a main transmission driven by the engine and main drive wheels driven by the main transmission; the auxiliary drive system comprising;

- left and right auxiliary drive wheels each of which are driven by an independent hydraulic motor located in a separate hydraulic circuit, the separate hydraulic circuits each having a variable displacement pump;
- a main speed sensor providing a main speed signal indicating the speed of the main drive wheels;
- auxiliary wheel speed sensors providing auxiliary wheel speed signals indicating the speeds of the left and right auxiliary drive wheels;
- an auxiliary drive controller controllably connected to the variable displacement hydraulic pumps, the auxiliary drive controller being in communication with the main speed sensor for receiving the main speed signal, the auxiliary drive controller being in communication with the auxiliary wheel speed sensors for receiving the auxiliary wheel speed signals, the auxiliary drive controller independently controlling the output of the variable displacement hydraulic pumps in response to the main speed signal and the auxiliary wheel speed signals so that the auxiliary drive wheels are driven at a speed proportional to the main drive wheels, wherein a minimum engine speed boundary is stored in the auxiliary drive controller, the auxiliary drive controller receives an engine speed signal from an engine speed sensor indicating the speed of the engine, the auxiliary drive controller reduces the output of the left and right variable displacement hydraulic pumps if the engine speed signal falls below the minimum engine speed boundary.

* * * * *